June 8, 1948.  W. W. H. DEAN  2,443,098
APPARATUS FOR DETERMINING THE WEIGHT AND
CENTER OF GRAVITY OF VEHICLES
Filed Feb. 28, 1944  2 Sheets-Sheet 1
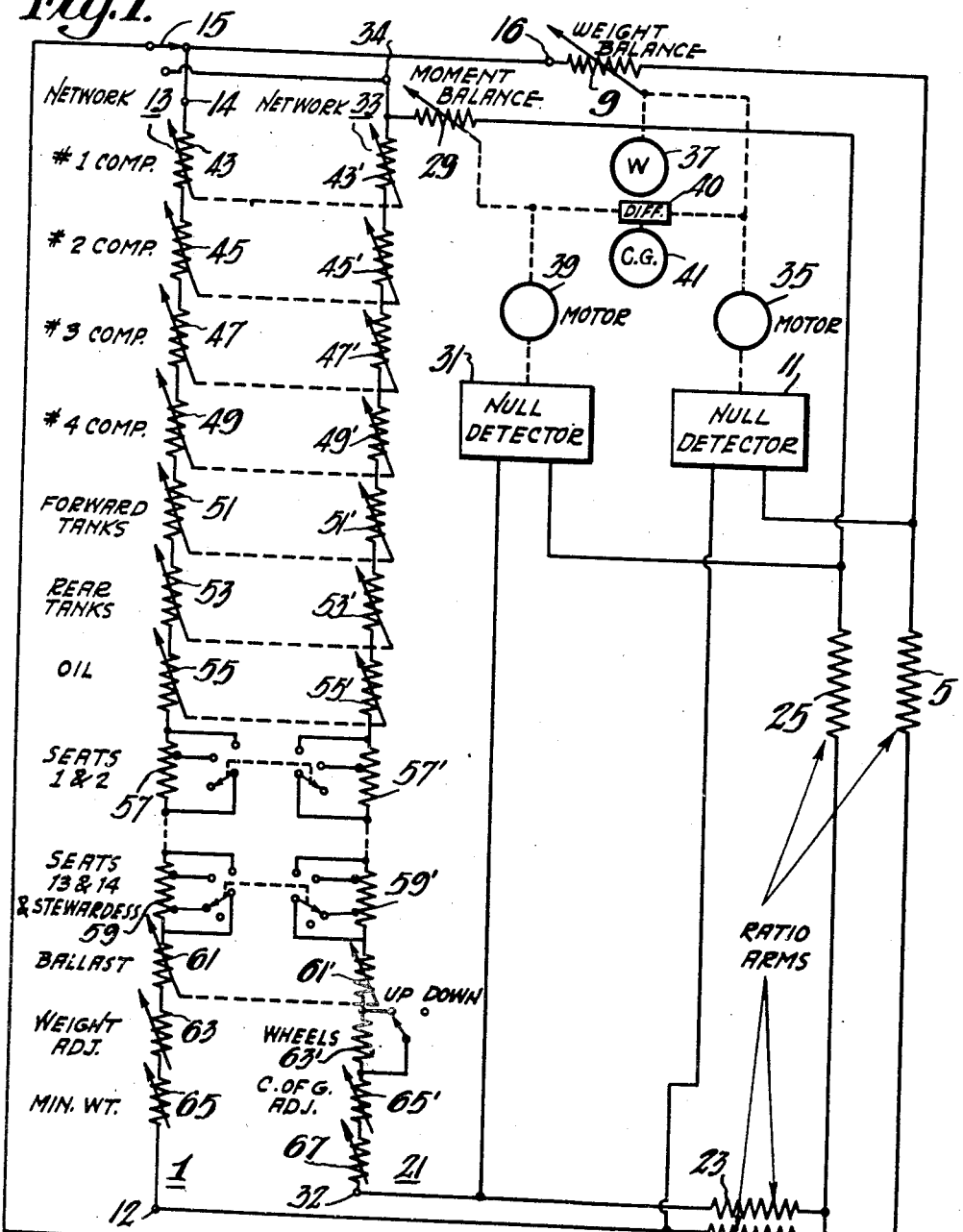
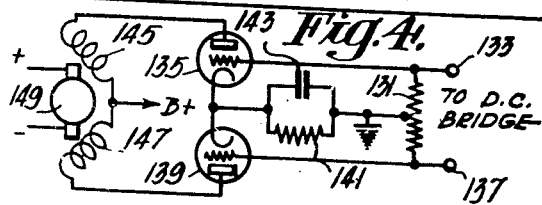
INVENTOR.
William W. H. Dean
BY
C. D. Tuska
ATTORNEY

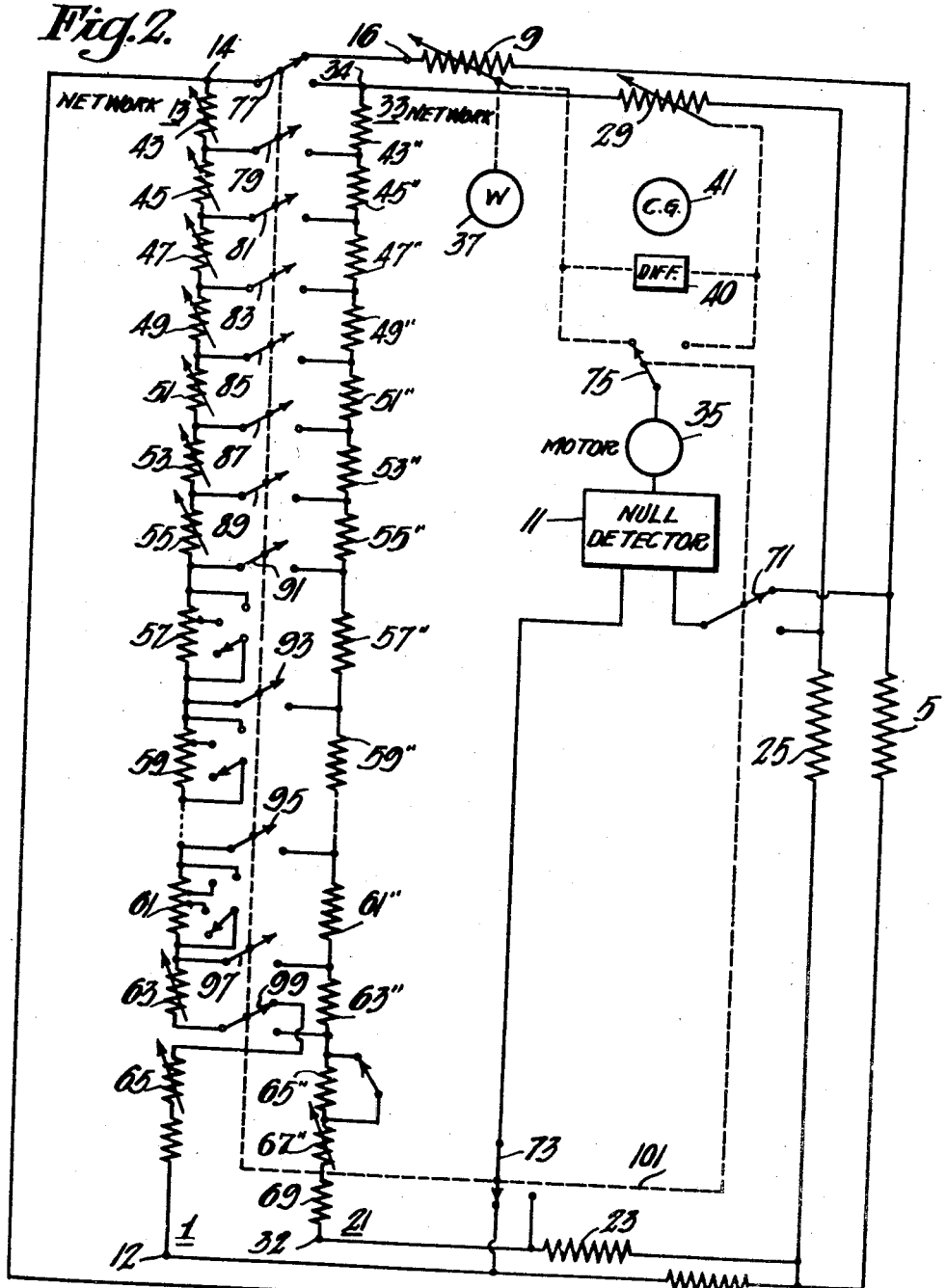

Patented June 8, 1948

2,443,098

UNITED STATES PATENT OFFICE 2,443,098

APPARATUS FOR DETERMINING THE WEIGHT AND CENTER OF GRAVITY OF VEHICLES

William W. H. Dean, Pointe Claire, Quebec, Canada, assignor to Radio Corporation of America, a corporation of Delaware Application February 28, 1944, Serial No. 524,277

12 Claims. (Cl. 73—65)

This invention relates generally to measuring apparatus and more particularly to an improved means for determining the total loaded weight and the location of the center of gravity of loaded vehicles.

More particularly, the invention contemplates the use of a pair of balanced Wheatstone bridges which provide separate electrical means for determining the total loaded weight and the total loaded moments of a particular type of loaded vehicles such, for example, as an aircraft, and differential means responsive to the weight and the moment determining means for indicating the center of gravity of the loaded vehicle.

The invention may comprise one of two principal forms, each of which include two separately adjustable Wheatstone bridges. The bridges may be actuated by manually adjusting a plurality of separate resistive elements in accordance with the loaded weight distribution, and then by manually adjusting the balancing resistive arm of each of the bridges until each bridge is balanced. A modification of the system comprises means for installing variable resistive elements in various portions of the loaded vehicle, and separate means for adjusting said resistors in accordance with the actual load distribution throughout the vehicle. The bridge balancing resisitve arms thence may be manually adjusted to balance the bridges, or they may be actuated by the bridge balancing indicator circuit automatically to balance the bridge.

Briefly, each bridge comprises two fixed resistors comprising fixed ratio arms, preferably having a resistance ratio of 1 to 1, an adjustable bridge balancing resistor arm, and a fourth series resistive arm comprising a plurality of separately adjustable serially connected variable resistors each characteristic of the loaded weight or the loaded moment of a predetermined portion of the loaded vehicle. The various series resistors of the fourth bridge arm are actuated separately either manually or by means of the loading weight as described hereinafter. After the bridge is balanced, the total loaded weight is indicated as a function of the adjustment of the weight bridge balanced arm, and the center of gravity, with respect to an arbitrarily fixed reference point, is indicated by a second indicator differentially connected to the weight and moment bridge balance adjustable resistors.

Among the objects of the invention are to provide an improved means for measuring the loading weight of a vehicle. Another object of the invention is to provide an improved means for determining the moments of the various portions of a loaded vehicle. A further object of the invention is to provide an improved means for determining the total loading weight and the center of gravity of a loaded vehicle.

Further objects of the invention include means providing an electrical method for calculating the load distribution characteristics of a loaded vehicle. Another object of the invention is to provide Wheatstone bridge means, responsive to the load distribution and load moments of a loaded vehicle, and means for balancing automatically said bridge means to indicate the total weight and the center of gravity of said loaded vehicle. An additional object of the invention is to provide an improved means for adjusting the resistance of a Wheatstone bridge circuit element in response to the loading of a predetermined portion of a loaded vehicle.

The invention will be described in greater detail by reference to the accompanying drawings of which Figure 1 is a schematic circuit diagram of one embodiment thereof, Figure 2 is a schematic circuit diagram of a second embodiment thereof, Figure 3 is a partially schematic fragmentary elevational view of a weight actuated bridge variable resistive element, and Figure 4 is a schematic circuit diagram of an automatic bridge balancing circuit for use with a D.-C. resistive bridge. Similar reference characters are applied to similar elements throughout the drawings.

Referring to Figure 1 of the drawings, a first resistive bridge 1 includes serially-connected first and second equal resistive ratio arms 3, 5, respectively. The common terminals of the series resistors 3, 5 are connected to one terminal 7 of a source of alternating or direct energizing potential. The remaining terminal of the second resistor 5 is connected to one terminal of an adjustable bridge balancing resistor 9, and to one terminal of a first null detector 11. The remaining terminal of the first bridge resistor 3 is connected to the remaining terminal of the first null detector 11 and to one terminal 12 of a weight determining resistive network 13. The remaining terminal 14 of the weight determining resistive network 13 is connected to the remaining terminal 16 of the bridge balancing resistor 9 to form a closed series resistive circuit including the resistors 3, 5, 9 and the network 13. The common terminal of the resistive network 13 and the balancing resistor 9 is connected to one fixed contact of a single-pole, double-throw switch 15. The movable contact of the switch 15 is connected to the remaining terminal 17 of the source of bridge energizing potential.

Similarly, a second resistive bridge 21 includes third and fourth resistive bridge ratio arms 23, 25, respectively. The common terminals of the third and fourth resistive bridge ratio arms 23, 25 are connected to the common terminal of the first and second bridge ratio arms 3, 5, and to the terminal 7 of the source of energizing potential. The remaining terminals of the third and fourth ratio arms 23, 25 are connected to a second null detector 31. The common terminals of the fourth ratio arm 25 and the second null detector 31 are connected to one terminal of a moment balancing bridge arm 29. The remaining terminal of the third bridge ratio arm 23 is connected to one terminal 32 of a moment determining resistive network 33. The remaining terminal 34 of the moment determining resistive network 33 is connected to the remaining terminal of the moment balancing resistor 29 and to the remaining fixed contact of the switch 15.

The first null detector 11, connected in the first bridge 1, is connected to a first motor 35 which is arranged to actuate the weight balancing resistor 9 to balance the bridge 1 for all adjustments of the weight determining resistive network 13. The operation of the null detector and motor for actuating the weight balancing resistor will be described in detail hereinafter. The adjustment of the weight balancing resistor 9 actuates a weight indicator 37 which may be calibrated in terms of vehicle total load weight.

Similarly, the second null detector 31, connected to the second bridge 21, is connected to the second motor 39 which actuates the moment balancing resistor 29 to balance automatically the second bridge 21 for all adjustments of the resistors of the moment determining network 33. A mechanical differential 40, interconnecting the actuating means of the weight balancing resistor 9 and the moment balancing resistor 29, actuates a second indicator 41 which may be calibrated in terms of the center of gravity of the loaded vehicle, since the differential coupling provides means for indicating the total moment, as determined by the second bridge 21, divided by the total weight, as determined by the bridge 1, thereby indicating the center of gravity of the vehicle.

The weight determining resistive network 13 includes a plurality of serially connected separately adjustable resistors 43, 45, 47, 49, 51, 53, 55, 57, 59, 61, 63 and 65, each of which may be adjusted separately to represent the total load weight of the various portions of the vehicle indicated on the drawing. The moment determining network 33, connected in the second bridge 21, includes a similar serially-connected group of individually adjustable resistors 43', 45', 47', 49', 51', 53', 55', 57', 59', 61', 63', 65' and 67' each of which adjustable resistive elements are ganged with the corresponding resistive element of the weight determining network 13. Adjustment of the weight determining resistor for a predetermined portion of the loaded vehicle thereby adjusts a corresponding resistor in the moment determining network 33 which varies the resistance in the moment determining network as a function of the moment of the particular loading weight.

The various adjustable resistors of the weight determining network 13 and the moment determining network 33 may be actuated manually as a function of individual known weights loaded in each portion of the vehicle, or they may be actuated by the actual unknown loading weights. In the latter arrangement, the resistive elements are disposed, for example, under weight responsive portions of the vehicle compartment floors, whereby the load applied to the floor varies the resistance of corresponding resistive elements which are connected to the remainder of the bridge network through suitable cables, not shown.

The mechanical differential mechanism 40 which interconnects the adjusting means on the weight balancing resistor 9 and the moment balancing resistor 29, may be any type of differential gearing mechanism known in the art which will provide differential indications for the center of gravity indicator 41 in response to adjustments of the weight and moment balancing resistors.

If desired, the first and second motors 35, 39 may be omitted, and the first and second null detector circuits simplified to comprise merely bridge balancing meters, whereby the bridge balancing resistors are adjusted to provide null indications on said meters in the usual manner of balancing Wheatstone bridges.

Referring to Figure 2, the weight and moment determining bridges 1, 21 comprise similar ratio arms 3, 5 and 23, 25, similar weight balancing and moment balancing adjustable resistive arms 9, 29, and similar weight determining networks 13 and 33 to the elements described in the circuit of Figure 1. Similarly, a weight indicator 37, actuated by the adjustment of the weight balancing resistor 9, and a center of gravity indicator 41, actuated by the differential mechanism 40 in response to differential adjustments of the weight balancing and moment balancing resistors 9, 29, may be actuated by either motor control or by manual adjustment, as described for the circuit of Fig. 1.

A single null detector 11 and a single motor 35, connected, respectively, through switches 71, 73, 75, may be selectively connected to either bridge network 1, 21 and the motor 35 may be selectively connected to actuate either balancing resistor 9, 29.

The moment determining network 33 comprises a plurality of fixed multiplying resistors 43", 45", 47", 49", 51", 53", 55", 57", 59", 61", 63", 65", 67" and 69 which are selectively connected in parallel with the adjustable resistors 43, 45, 47, 49, 51, 53, 55, 57, 59, 61, 63, 65 of the weight determining network 13 by means of ganged switches 77, 79, 81, 83, 85, 87, 89, 91, 93, 95, 97 and 99. The dash line 101, interconnecting all of the switches 71, 73, 75, 77, 79, 81, 83, 85, 87, 89, 91, 93, 95, 97 and 99 indicates that all of said switches may be ganged for unitary control whereby for one position of the switches the weight determining network 13 is operative, and for the alternate position of the switches the fixed moment determining network 33 is operatively combined with the adjustable weight network 13. Therefore, in the first position of the switches, the weight indicator 37 is actuated to indicate the total load weight, and in the alternate position of the switches the center of gravity indicator 41 is differentially actuated by the prior adjustment of the weight balancing resistor 9 and by the subsequent adjustment of the moment balancing resistor 29. It should be understood that in this embodiment of the invention the differential mechanism preferably should include a worm gear element in order to prevent reaction upon the preliminary adjustment of the weight balancing resistor 9 as the moment balancing resistor 29 is subsequently actuated. The motor 35 may be omitted entirely and the bridge balancing resistors 9, 29 adjusted manually, if desired. Similarly, if the motor is omitted, the null indicator need comprise only a conventional bridge balance indicating meter.

The characteristics of the various fixed resistive elements comprising the moment determining network 33 may be calculated readily to provide the required multiplication factor, whereby adjustment of the corresponding parallel-connected adjustable resistive elements of the weight determining network 13 provide variations in the moment determining bridge 21 as a function of the moments of the various loading weights.

In Figure 3 a typical system of the self-actuating type includes a compartment having side walls 103, 105 and a movable floor 107 supported by springs 109 and guided by pistons 111 operating in guide cylinders 113. The adjustable resistive elements may be of the compression type, as indicated schematically by the resistor 115, interposed between the movable floor 107 and the base portion 117 of the compartment, or by a slider-type resistance 119, wherein a movable resistor contact 121 is pivoted at 123 and actuated by the movable compartment floor 107 through a lever arm 125. The variable resistor elements 115 or 119 may be terminated outside of the vehicle compartment in any convenient manner for connection to suitable cables connecting the resistors to the bridge network. It should be understood that the particular mechanical construction of the compartment floor and resistor actuating elements is included for the purpose of illustration, and that various other mechanical modifications thereof may be employed such as the use of pressure or liquid level for fluid loads.

The null indicators 11, 31, and the motors 35, 39 responsive thereto for automatically actuating the weight and moment bridge balancing resistors 9, 29, may be of any type known in the art such as, for example, the type of self-orienting mechanism employed in self-orienting radio direction finders or follow-up devices. If the resistance bridges 1, 21 are energized by a source of direct current, the null indicator circuit may comprise a relatively simple thermionic tube network of the type disclosed in Figure 4, and the motors 35, 39 may be D.-C. motors having a conventional armature and two oppositely phased field windings.

In the circuit of Figure 4, the null detectors of the circuits of Figs. 1 or 2 are connected to the end terminals 133, 137, of a center-tapped high resistor 131, the center tap of which may be grounded. One input terminal 133, connected to one arm of the bridge, is connected to the control electrode of a first thermionic tube 135. The remaining input terminal 137, connected to the opposite bridge arm, is connected to the control electrode of a second thermionic tube 139. The cathodes of the first and second thermionic tubes 135, 139 are connected together, and connected to ground through a conventional cathode bias resistor 141 and bypass capacitor 143. The anodes of the first and second thermionic tubes 135, 139 are connected to opposite ends of the motor field windings 145, 147, respectively. The remaining terminals of the field windings 145, 147 are connected together, and connected to a source of anode potential (not shown) for energizing the field windings and the anode circuits. The armature 149 of the motor is connected in the customary manner through brushes to the source of D.-C. energizing potential.

When the resistive bridges are energized from a source of alternating potential, the null detector circuit and motor actuating circuit may be somewhat more complicated. With this arrangement, a practical solution is found by employing a two-phase A.-C. motor one winding of which is energized in phase with the potential source connected to the bridge, and the remaining winding of which is energized at a phase which approaches quadrature therewith as the bridge approaches balance. Many modifications of this arrangement are known in the self-orienting radio direction finder art. A typical example of a circuit of this type is disclosed in U. S. Patent 2,314,029 granted to Donald S. Bond and Wendell L. Carlson on March 16, 1943, and assigned to the same assignee as the instant application. Further description herein of the specific circuits which might be employed for self-balancing of an A.-C. bridge of the type described as such circuits are well known to those skilled in the art.

Thus the invention disclosed comprises two embodiments, and several modifications thereof, of an improved means for electrically determining the total loaded weight and the center of gravity of loaded vehicles. The system described provides an extremely convenient and accurate method of determining load characteristics and load distribution which provides greater flexibility, speed, and accuracy than known mechanical load measuring or computing systems. It should be understood that the particular circuit constants of the resistor networks 13, 33 must be determined for each different type and variety of vehicle.

I claim as my invention:

1. Electrical apparatus for determining the weight and center of gravity of a vehicle including a first bridge network, a second bridge network, means for adjusting said first network as a function of said vehicle weight, means for balancing said first network, means responsive to said network balance adjusting means for indicating said weight, means for adjusting said second network as a function of the mechanical moments of predetermined portions of said vehicle, means for balancing said second network, and differential means responsive to said balance adjusting means of both of said networks for indicating the center of gravity of said vehicle.

2. Electrical apparatus for determining the weight and the center of gravity of a loaded vehicle including a first bridge network, a second bridge network, means for electrically energizing said networks, first means for adjusting said first network in accordance with the loading of said vehicle, second adjusting means for balancing said first network, means for indicating the total load of said vehicle in accordance with said adjustment of said second adjusting means, third means for adjusting said second network in accordance with the mechanical moments of predetermined portions of said vehicle, fourth adjusting means for balancing said second network, and differential means for indicating the center of gravity of said loaded vehicle responsive to said adjustments of said second and said fourth adjusting means.

3. Electrical apparatus for determining the weight and center of gravity of a loaded vehicle including a first Wheatstone bridge network, a second Wheatstone bridge network, means for electrically energizing said networks, first means for adjusting at least one portion of said first network in accordance with the loading of said vehicle, second adjusting means for balancing said first network, means for indicating the total load of said vehicle in accordance with said adjustment of said second adjusting means, third means for adjusting at least one portion of said second network in accordance with the mechanical moments of predetermined portions of said vehicle, fourth adjusting means for balancing said second network, and differential means for indicating the center of gravity of said loaded vehicle responsive to said adjustments of said second and said fourth adjusting means.

4. Electrical apparatus for determining the weight and the center of gravity of a loaded vehicle including a first Wheatstone bridge network, a second Wheatstone bridge network, means for electrically energizing said networks, first means for adjusting at least one portion of said first network in accordance with the loading of said vehicle, second adjusting means for balancing said first network, means mechanically connected to said second adjusting means for indicating the total load of said vehicle in accordance with said adjustment of said second adjusting means, third means for adjusting at least one portion of said second network in accordance with the mechanical moments of predetermined portions of said vehicle, fourth adjusting means for balancing said second network, and differential means mechanically connected to said second and fourth adjusting means for indicating the center of gravity of said loaded vehicle as a function of said adjustments of said second and said fourth adjusting means.

5. Electrical apparatus for determining the weight and the center of gravity of a loaded vehicle including a first Wheatstone resistive bridge network, a second Wheatstone resistive bridge network, means for electrically energizing said networks, first variable resistive means for adjusting at least one portion of said first network in accordance with the loading of said vehicle, second variable resistive adjusting means for balancing said first network, means mechanically connected to said second adjusting means for indicating the total load of said vehicle in accordance with said adjustment of said second adjusting means, third variable resistive means for adjusting at least one portion of said second network in accordance with the mechanical moments of predetermined portions of said vehicle, fourth variable resistive adjusting means for balancing said second network, and differential means mechanically connected to said second and fourth adjusting means for indicating the center of gravity of said loaded vehicle as a function of said adjustments of said second and said fourth adjusting means.

6. Apparatus of the type described in claim 2 characterized in that said balancing means for said first and said second bridge networks includes a plurality of current detecting devices each connected to one of said networks, and a plurality of electro-mechanical devices each responsive to one of said current detecting devices for adjusting said second and said fourth bridge adjusting means until said bridge networks are balanced with respect to said current detecting devices.

7. Apparatus of the type described in claim 5 characterized in that said balancing means for said first and said second bridge networks includes a plurality of current detecting devices each connected to one of said networks, and a plurality of electromechanical devices each responsive to one of said current detecting devices for adjusting said second and said fourth bridge adjusting means until said bridge networks are balanced with respect to said current detecting devices.

8. Electrical apparatus for determining the weight and the center of gravity of a loaded vehicle including a first bridge network, a second bridge network, means for selectively electrically energizing said networks, first means for adjusting said first network in accordance with the loading of said vehicle, second adjusting means for balancing said first network, means for indicating the total load of said vehicle in accordance with said adjustment of said second adjusting means, third means for adjusting said second network in accordance with the mechanical moments of predetermined portions of said vehicle, fourth adjusting means for balancing said second network, and differential means for indicating the center of gravity of said loaded vehicle responsive to said adjustments of said second and said fourth adjusting means.

9. Apparatus of the type described in claim 2 characterized in that said balancing means for said first and said second bridge networks includes a common current detecting device connected selectively to said networks, an electromechanical device responsive to said current detecting device for adjusting selectively said second and said fourth bridge adjusting means until said bridge networks are balanced with respect to said current detecting device, and common means for selectively energizing said bridge networks and for connecting said networks to said current detecting device.

10. Electrical apparatus for determining the weight and the center of gravity of a loaded vehicle including a first bridge network, a second bridge network, means for electrically energizing said networks, first means including a plurality of weight responsive impedance elements disposed at predetermined points in said vehicle and connected to said first network for adjusting said first network in accordance with the loading of said vehicle, second adjusting means for balancing said first network, means for indicating the total load of said vehicle in accordance with said adjustment of said second adjusting means, third means including a plurality of other weight responsive impedance elements disposed at other predetermined points in said vehicle and connected to said second network for adjusting said second network in accordance with the mechanical moments of predetermined portions of said vehicle, fourth adjusting means for balancing said second network, and differential means for indicating the center of gravity of said loaded vehicle responsive to said adjustments of said second and said fourth adjusting means.

11. Electrical apparatus for determining the weight and the center of gravity of a loaded vehicle including a first bridge network, a second bridge network, means for electrically energizing said networks, first means including a plurality of weight responsive impedance elements disposed at predetermined points in said vehicle and connected to said first network for adjusting said first network in accordance with the loading of said vehicle, second adjusting means for balancing said first network, means for indicating the total load of said vehicle in accordance with said adjustment of said second adjusting means, third means including means for selectively connecting said weight responsive elements to said second network for adjusting said second network in accordance with the mechanical moments of predetermined portions of said vehicle, fourth adjusting means for balancing said second network, and differential means for indicating the center of gravity of said loaded vehicle responsive to said adjustments of said second and said fourth adjusting means.

12. Electrical apparatus for determining the weight and center of gravity of a vehicle including a first network, a second network, means for adjusting said first network as a function of said vehicle weight, further means for adjusting said first network, means responsive to said first network further adjusting means for indicating said weight, means for adjusting said second network as a function of the mechanical moments of predetermined portions of said vehicle, further means for adjusting said second network, and differential means responsive to both of said further adjusting means of both of said networks for indicating the center of gravity of said vehicle.

W. W. H. DEAN.

REFERENCES CITED

The following references are of record in the file of this patent:

UNITED STATES PATENTS

| Number | Name | Date |
|---|---|---|
| 1,407,078 | Murray | Feb. 21, 1922 |
| 1,515,995 | Bryce | Nov. 18, 1924 |
| 1,826,762 | Franklin | Oct. 13, 1931 |
| 2,123,142 | McMaster | July 5, 1938 |
| 2,179,822 | Imm | Nov. 14, 1939 |
| 2,255,814 | Roche | Sept. 16, 1941 |
| 2,336,142 | Watson | Dec. 7, 1943 |
| 2,373,503 | Schlieben et al. | Apr. 10, 1945 |

FOREIGN PATENTS

| Number | Country | Date |
|---|---|---|
| 387,887 | Great Britain | Feb. 16, 1933 |